US009407971B2

(12) United States Patent
Kelley

(10) Patent No.: US 9,407,971 B2
(45) Date of Patent: Aug. 2, 2016

(54) PRESENTATION OF SUMMARY CONTENT FOR PRIMARY CONTENT

(71) Applicant: Adobe Systems Incorporated, San Jose, CA (US)

(72) Inventor: Yohko A. F. Kelley, Woodinville, WA (US)

(73) Assignee: Adobe Systems Incorporated, San Jose, CA (US)

( * ) Notice: Subject to any disclaimer, the term of this patent is extended or adjusted under 35 U.S.C. 154(b) by 295 days.

(21) Appl. No.: 13/851,862

(22) Filed: Mar. 27, 2013

(65) Prior Publication Data

US 2014/0298378 A1 Oct. 2, 2014

(51) Int. Cl.
*H04N 7/10* (2006.01)
*H04N 7/025* (2006.01)
*H04N 21/81* (2011.01)
*H04N 21/8549* (2011.01)

(52) U.S. Cl.
CPC ....... *H04N 21/8133* (2013.01); *H04N 21/8549* (2013.01)

(58) Field of Classification Search
CPC .................. H04N 21/8133; H04N 21/8549
See application file for complete search history.

(56) References Cited

U.S. PATENT DOCUMENTS

2009/0327894 A1* 12/2009 Rakib et al. .................... 715/719
2011/0154405 A1* 6/2011 Isaias ............................. 725/53

* cited by examiner

*Primary Examiner* — Oschta Montoya
(74) *Attorney, Agent, or Firm* — Wolfe-SBMC

(57) ABSTRACT

Techniques for presentation of summary content for primary content are described. In at least some embodiments, primary content includes different types of content, such as television programs, live broadcasts, web content, and so forth. Summary content can be generated that encapsulates various aspects and/or events of primary content. In at least some embodiments, summary content is selectable to retrieve other types of content. For instance, summary content can be selected to retrieve supplementary content and/or associated primary content. Implementations enable a variety of different interactions with summary content, such as searching, bookmarking, browsing, and so on.

20 Claims, 11 Drawing Sheets

PRESENTATION OF SUMMARY CONTENT FOR PRIMARY CONTENT

BACKGROUND

Consumers today have access to a tremendous variety of content, such as television programs, movies, sports telecasts, online content, and so forth. A typical consumer also has multiple devices on which content can be consumed, such as a television, a desktop computer, a portable computer (e.g., a laptop computer and/or a tablet), a smartphone, and so on. While the availability and accessibility of content provides consumers with many alternatives for consuming content, consumers may also become overwhelmed with such variety.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for presentation of summary content for primary content are described. In at least some embodiments, primary content includes different types of content, such as television programs, live broadcasts, web content, and so forth. Summary content can be generated that encapsulates various aspects and/or events of primary content. In at least some embodiments, summary content is selectable to retrieve other types of content. For instance, summary content can be selected to retrieve supplementary content and/or associated primary content. Implementations enable a variety of different interactions with summary content, such as searching, bookmarking, browsing, and so on.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
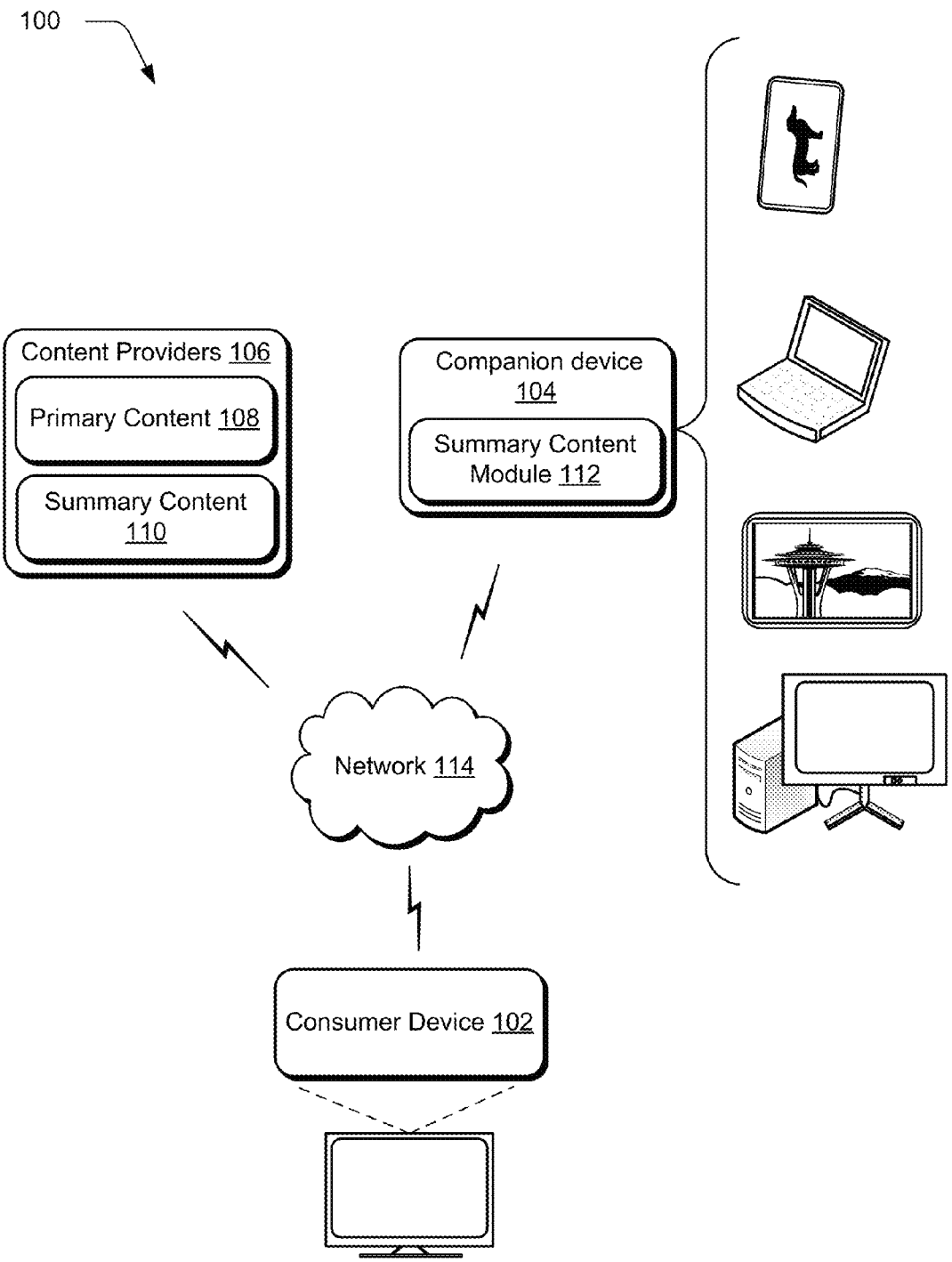
FIG. 1 is an illustration of an environment in an example implementation that is operable to employ techniques discussed herein in accordance with one or more embodiments.

Techniques for presentation of summary content for primary content are described. In at least some embodiments, primary content includes different types of content, such as television programs, live broadcasts, web content, and so forth. Summary content can be generated that encapsulates various aspects and/or events of primary content. For instance, summary content can be presented as a chronological representation of primary content, such as key events, highlights, advertisements, and so forth that occur during a presentation of primary content. In at least some implementations, primary content can be presented on one device (e.g., a television), and associated summary content can be presented on a different device, e.g., a portable computing device. Alternatively or additionally, primary content and summary content can be presented on the same device.

For example, consider an implementation where a sporting event is televised. The sporting event can be considered as an instance of primary content. During broadcast of the sporting event, summary content can be output that describes various events, such as scoring events, injuries, penalties, advertisements, and so on. The summary content can be incrementally presented as these various events occur. For example, as events occur, corresponding summary items can be added to the summary content. When the sporting event is complete, the summary content can represent an encapsulation of the sporting event from beginning to end.

In at least some embodiments, summary content is selectable to retrieve other types of content. For instance, summary content can be selected to retrieve supplementary content. Generally, supplementary content includes additional information and or content that supplements and/or enhances associated primary content. Summary content can also be selected to present associated primary content. For instance, a user can browse through different instances of summary content, and can select an instance of summary content to initiate playback of associated primary content.

Implementations enable a variety of different interactions with summary content. For instance, summary content can be searchable to retrieve instances of summary content based on search criteria. Summary content can also be bookmarked such that a user can subsequently view a list of bookmarked summary content. Thus, embodiments provide convenient and unobtrusive ways of encapsulating primary content, and for locating and viewing primary content via summary content.

In the following discussion, an example environment is first described that is operable to employ techniques described herein. Next, a section entitled "Example Implementation Scenarios" describes some implementation scenarios involving techniques discussed herein which may be employed in the example environment as well as in other environments. Following this, a section entitled "Example Procedures" describes some example methods in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for presentation of summary content for primary content. Environment 100 includes a consumer device 102 and a companion device 104. The consumer device 102 is representative of a device via which a user can consume content. Examples of the consumer device 102 include a television, a desktop PC, a laptop computer, a tablet computer, and so forth. In at least some implementations, a user can navigate the consumer device 102 to a content source to enable content to be provided from the content source to the consumer device 102. For instance, in a television scenario, a television program can be provided by a television network (e.g., a broadcast network, a cable network, a satellite network, and so forth) for display by the consumer device 102.

The companion device 104 is representative of various types of devices that can be employed to host summary content according to techniques discussed herein. Examples of the companion device 104 include portable computing devices, such as a smartphone, a laptop computer, a tablet computer, and so forth. This is not intended to be limiting, however, and the companion device 104 can be embodied as a wide variety of different device types and/or form factors. Example implementations and configurations of the consumer device 102 and the companion device 104 are described below in FIG. 13.

The environment 100 further includes content providers 106, which are representative of various enterprises and/or services that provide primary content 108 that can be accessed and consumed, such as by the consumer device 102 and/or the companion device 104. Examples of the content providers 106 include television networks, such as a broadcast network, a cable network, a satellite network, and so forth. The content providers 106 may also include online content providers, such as websites and/or other web-based enterprises that can generate and distribute content online. A variety of other types and implementations of the content providers 106 are contemplated within the spirit and scope of the claimed embodiments.

The primary content 108 is representative of different types of content that can be generated and/or distributed by the content providers 106. Examples of the primary content 108 include television programs (e.g., pre-recorded programs, live broadcasts, and so forth), sports broadcasts (live and/or recorded), movies, web content (e.g., content distributed via the Internet), and so forth. Generally, the primary content 108 includes any type of content that can be made available for consumption by a device.

Associated with the primary content 108 is summary content 110, which is representative of content that can summarize and/or abstract portions of the primary content 108 according to various techniques discussed herein. The summary content 110 can include various types of content, such as summarization information for the primary content 110, highlights of the primary content 110, advertisements, and so forth. Thus, in at least some embodiments, the content providers 106 can include advertisers that can provide the primary content 108 and/or the summary content 110 as advertisements. As detailed elsewhere herein, the summary content 110 can be provided to users via different mediums and in different forms. The summary content 110 may also be generated by a variety of different entities, such as the content providers 106 and/or other entities.

The companion device 104 further includes a summary content module 112, which is representative of functionality to perform various processing on the summary content 110 and enable the summary content 110 to be available for consumption, e.g., displayed. For instance, the primary content 108 can be provided to and displayed via the consumer device 102, while the summary content 110 can be provided to and displayed via the companion device 104. This can enable a co-viewing experience, whereby the primary content 108 is output by the consumer device 102, and at the same time the summary content 110 is output by the companion device 104. The summary content 110 is not limited to a co-viewing experience, however, and can be leveraged for a variety of different experiences and purposes independent of the primary content 108.

In at least some implementations, the summary content module 112 includes functionality to perform various types of synchronization tasks, such as synchronizing presentation of the summary content 110 with presentation of associated primary content 108. The summary content module 112, for example, can initiate presentation of summary content 110 on the companion device 104 in response to a variety of triggering events. Examples of triggering events include time-based triggers, such as synchronization of playback of summary content 110 with a pre-determined playback schedule for the primary content 108, e.g., a broadcast schedule. Other types of triggering events may be employed, however, such as recognition of audible signals from the primary content 108, timecode triggers detected during playback of primary content 108, wired and/or wireless event synchronization methods, and so on.

The summary content module 112 may further include functionality to initiate presentation of instances of the primary content 108. For example, implementations discussed herein include user selection of summary content 110 to initiate playback of associated instances of the primary content 108. Further to such embodiments, the summary content module 112 can retrieve and/or generate requests for the primary content 108. Thus, in at least some embodiments, the summary content module 112 can enable presentation of the summary content 110, as well as serving as a portal to the primary content 108.

While some embodiments are discussed herein with reference to consuming the primary content 108 and the summary content 110 on different devices, this is not intended to be limiting. For example, at least some embodiments may be employed to consume both the primary content 108 and the summary content 110 via a single device, such as the consumer device 102. Thus, functionality of the summary content module 112 may be implemented via the consumer device 102, alternatively or additionally to the companion device 104. Functionality of the summary content module 112 can also be implemented via a network service, such as a cloud-based service.

The environment 100 further includes one or more networks 114 via which various entities of the environment 100 may communicate. The network(s) 114 may assume a variety of different wired and/or wireless network configurations, such as a local area network (LAN), a wide area network (WAN), the Internet, and so on. Further, although the various entities of the environment 100 are illustrated as discrete devices, this is not intended to be limiting. For instance, functionalities discussed with reference to the environment 100 and/or other portions of the discussion herein may be implemented in a distributed environment (e.g., "over the cloud"), as further described in relation to FIG. 13.

Having described an example environment in which the techniques described herein may operate, consider now a discussion of some example implementation scenarios in accordance with one or more embodiments.

Example Implementation Scenarios

The following discussion describes example implementation scenarios for presentation of summary content for primary content in accordance with one or more embodiments. The implementation scenarios may be employed in the environment 100 of FIG. 1, the system 1300 of FIG. 13, and/or any other suitable environment.

Figure 2:
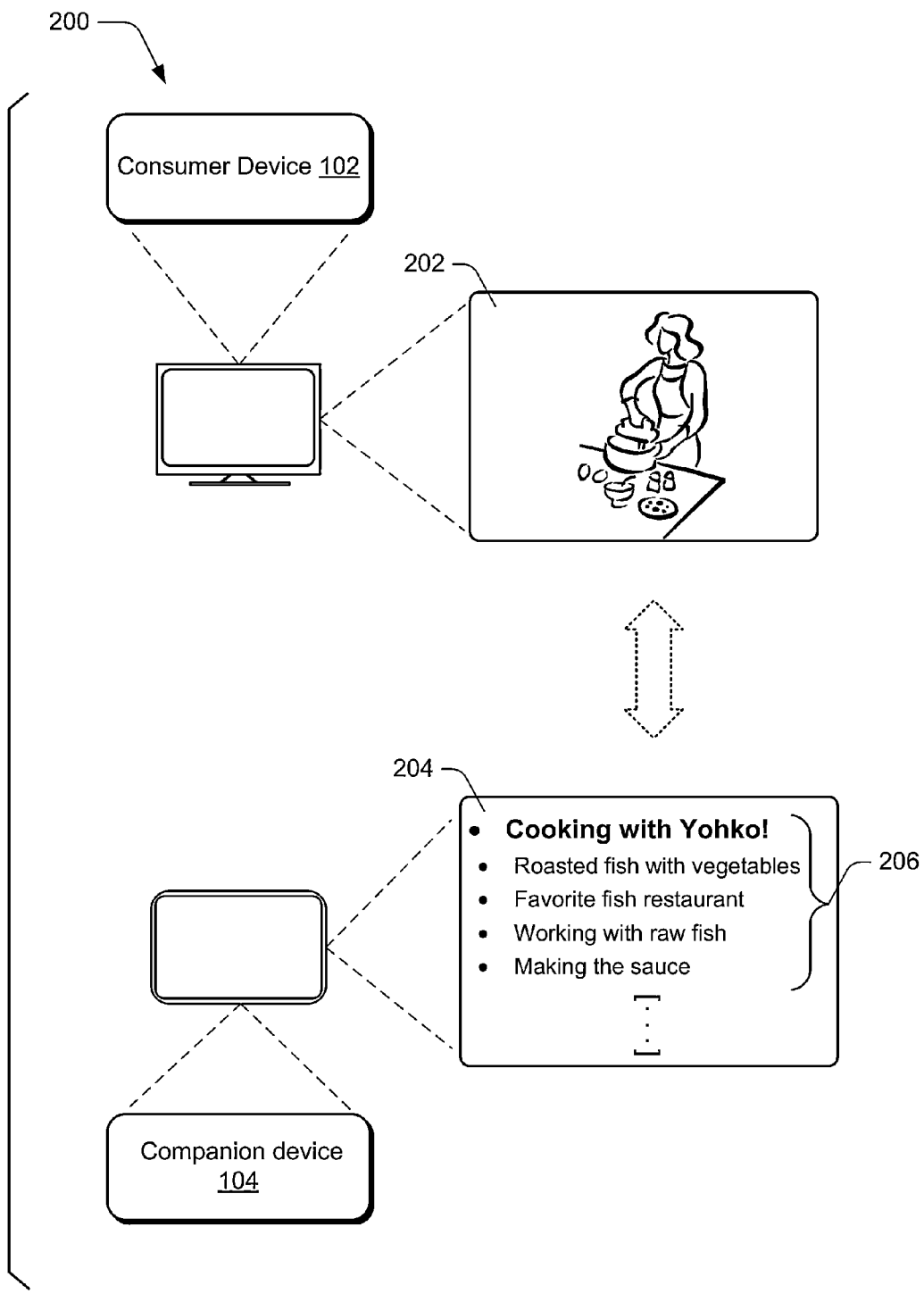
FIG. 2 illustrates an example implementation scenario in accordance with one or more embodiments.

FIG. 2 illustrates an example implementation scenario, generally at 200. Illustrated as part of the scenario 200 are the consumer device 102 and the companion device 104. Further to the scenario 200, the consumer device 102 outputs primary content 202. In this example, the primary content 202 includes a cooking program, such as produced and distributed by a television network.

The companion device 104 outputs summary content 204, which is representative of content that enhances and/or encapsulates various aspects of the primary content 202. For example, the summary content 204 presents a summary of portions of the primary content 202, such as key events, highlights, advertisements, and so forth, which occur as playback of the primary content 202 progresses.

In this example, the summary content 204 includes a descending list of summary items 206 associated with the primary content 202. Each of the summary items 206 are presented as a separate event-related item that includes a short description of an event that occurs during playback of the primary content 202. In at least some implementations, the summary items 206 are individually selectable to enable further information about a particular event to be retrieved and output.

According to various embodiments, the list of summary items 206 is populated as playback of the primary content 202 progresses. For example, during playback of an introductory portion of the primary content 202, a summary item that corresponds to the introduction (e.g., a program title event item) can be presented. As playback of the primary content 202 progresses and additional content-related events occur, the list of summary items 206 can be populated. For instance, the summary items 206 of the summary content 204 can be retrieved and displayed in real-time along with playback of the primary content 202. Thus, the summary content 204 can present in chronological order a condensed representation of events that occur during playback of the primary content 202.

In at least some embodiments, the summary content 204 can function as a navigational aid for the primary content 202. For instance, the summary content 204 can be browsed by a user, and selection of a particular summary item can initiate playback of the primary content 202 from an associated portion of the primary content 202.

FIGS. 3-6 illustrate portions of an example implementation scenario for presentation of primary content and summary content. For purpose of example, the implementation scenario includes a cooking program (e.g., a television show, online content, and so forth) as primary content.

Figure 3:
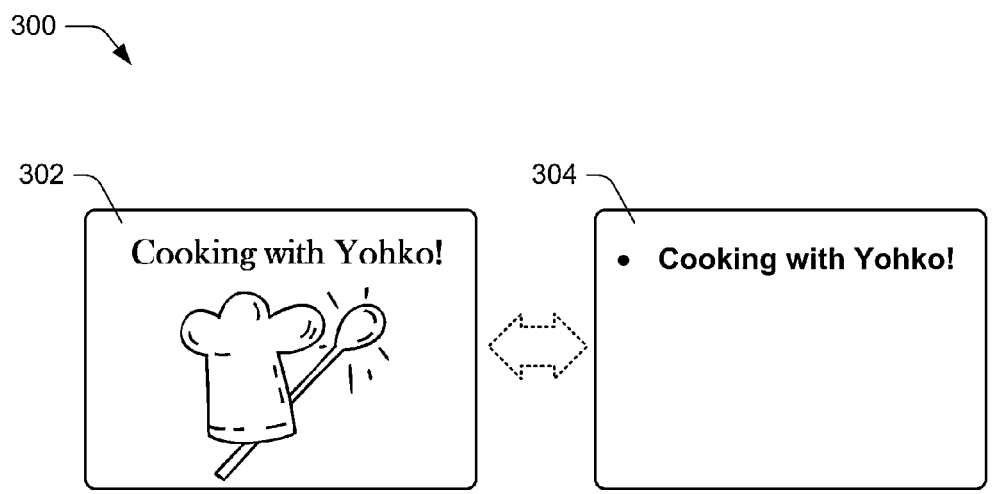
FIG. 3 illustrates an example implementation scenario in accordance with one or more embodiments.

FIG. 3 illustrates an example implementation scenario, generally at 300. Included as part of the scenario 300 are primary content 302 and summary content 304. In this example, the primary content 302 represents an introductory portion of a cooking program. Thus, the primary content 302 can have a particular duration, such as the first 60 seconds of the cooking program.

The summary content 304 presents an encapsulation of the primary content 302, such as text description of the primary content 302. In at least some implementations, the summary content 304 can be displayed in parallel with the primary content 302. For instance, initiating playback of the primary content 302 can trigger display of the summary content 304. As discussed elsewhere herein, selection of the summary content 304 can cause additional information related to the primary content 302 to be presented, such as further details and/or content for the cooking program.

Figure 4:
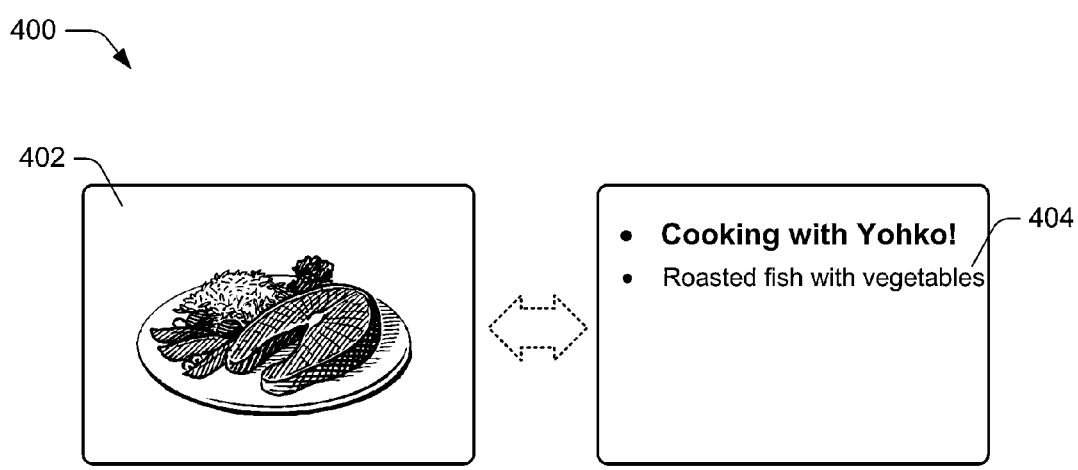
FIG. 4 illustrates an example implementation scenario in accordance with one or more embodiments.

FIG. 4 illustrates an example implementation scenario, generally at 400. The scenario 400 includes primary content 402 and summary content 404. The primary content 402 represents a portion of the cooking program that occurs subsequent to the primary content 302, discussed above. For example, the primary content 402 is a portion of the cooking program that introduces a topic that will be discussed during the current episode of the program.

The summary content 404 presents an encapsulation of the primary content 402, such as text description of the primary content 402. For example, the summary content 404 includes a description of subject matter included in the primary content 402, e.g., "roasted fish with vegetables."

Presentation of the summary content 404 can occur in a variety of different ways. For instance, as the cooking program progresses from presenting the primary content 302 to presenting the primary content 402, the summary content 404 can presented. This can occur based on an elapsed time for the cooking program, such as a timecode pointer that signals a transition from the primary content 302 to the primary content 402. As with other portions of summary content, the summary content 404 is selectable to retrieve additional information about the primary content 402.

Figure 5:
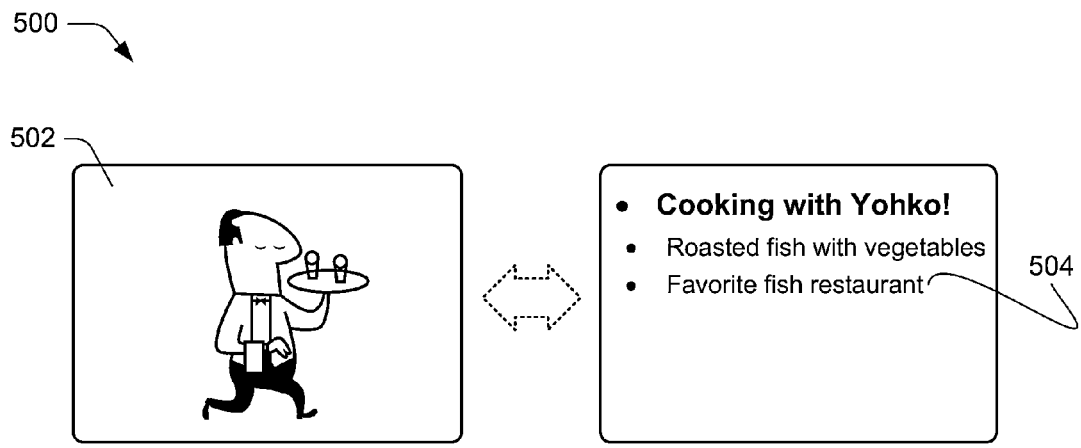
FIG. 5 illustrates an example implementation scenario in accordance with one or more embodiments.

FIG. 5 illustrates an example implementation scenario, generally at 500. The scenario 500 includes primary content 502 and summary content 504. The primary content 502 represents a portion of the cooking program that occurs subsequent to the primary content 402, discussed above.

Further to the scenario 500, the primary content 502 includes content that describes a particular restaurant. The summary content 504 encapsulates the primary content 502, such as via a short text description of the restaurant. The summary content 504 is selectable to present additional information about the restaurant, such as a menu for the restaurant, a map to the restaurant, and so forth. The summary content 504 may also be selectable to initiate certain actions, such as making a reservation at a restaurant, initiating a phone call to an entity, generating an email message to an entity, and so on.

Figure 6:
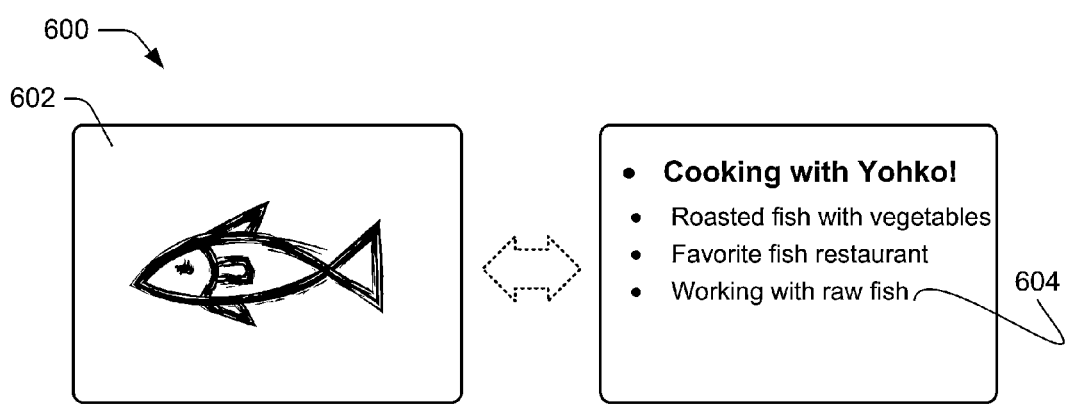
FIG. 6 illustrates an example implementation scenario in accordance with one or more embodiments.

FIG. 6 illustrates an example implementation scenario, generally at 600. The scenario 600 includes primary content 602 and summary content 604. The primary content 602 represents a portion of the cooking program that occurs subsequent to the primary content 502, discussed above.

The primary content 602 includes content that discusses particular cooking techniques, e.g., how to handle raw fish while cooking. The summary content 604 encapsulates the primary content 602, such as via a short text description of the cooking technique. The summary content 604 is selectable to present additional information about the cooking technique, such as a video demonstration of additional details for handling raw fish in a cooking scenario.

As illustrated in the scenarios 300-600 above, summary content can be cumulatively presented as playback of primary content progresses to present an encapsulation of primary content up to various points during playback. As discussed elsewhere herein, however, summary content may also be presented "as a whole," such as a compilation of summary content that describes an entire instance of primary content.

The text-based summary content described in the scenarios 300-600 is presented for ease of illustration only, and it is contemplated that a wide variety of different types of content can be employed for summary content. For example, consider the following example of summary content.

Figure 7:
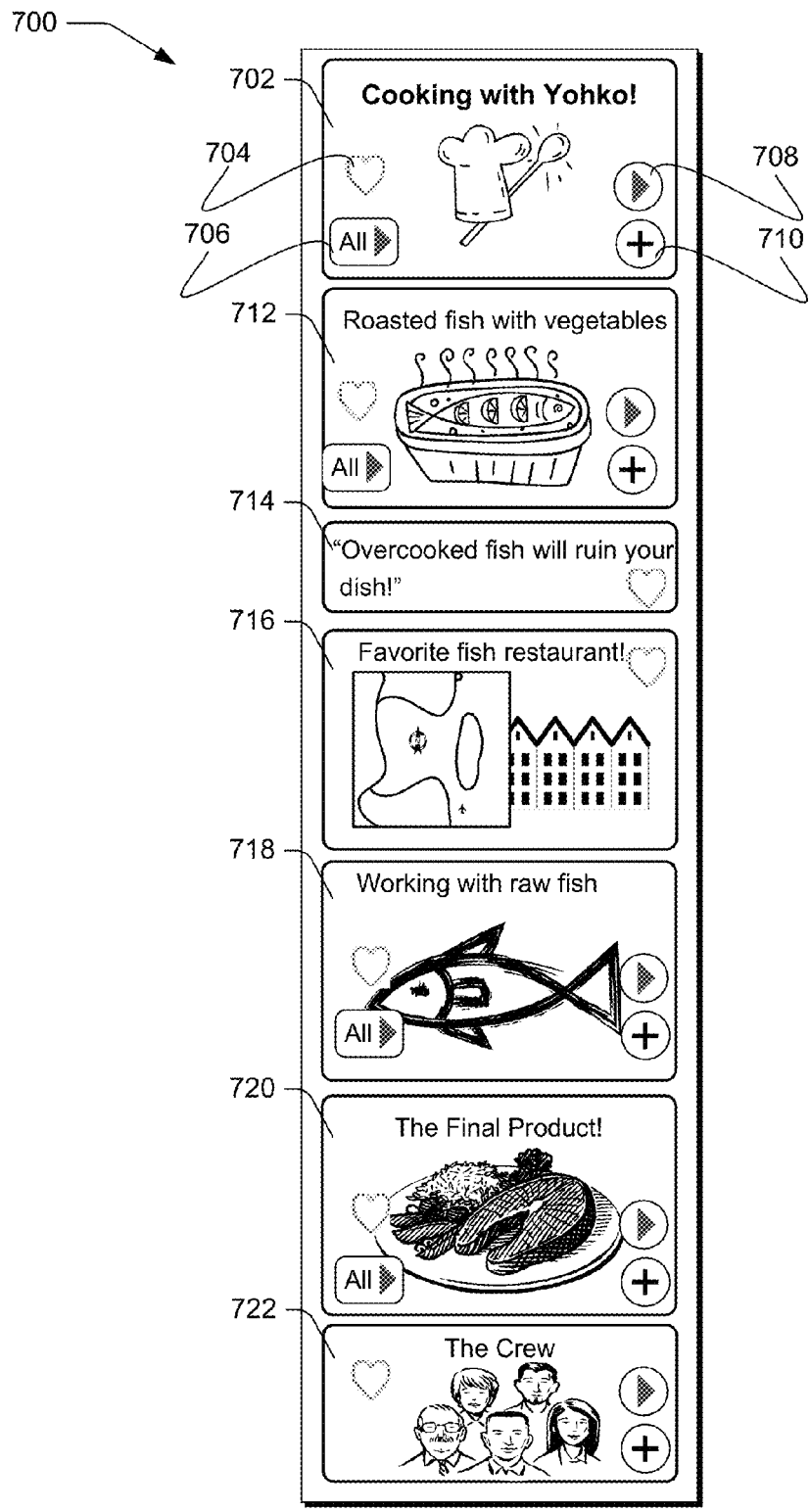
FIG. 7 illustrates an example implementation of summary content in accordance with one or more embodiments.

FIG. 7 illustrates example summary content 700 in accordance with one or more embodiments. The summary content 700 includes a number of content items that function as representations of various portions of primary content.

For example, the summary content 700 includes an introductory item 702, which is associated with an introductory portion of primary content, e.g., the primary content 302 discussed above. The introductory item 702 includes a still image, such as an image extracted from a portion of primary content. The introductory item 702 further includes a favorite control 704, which is selectable to indicate that a user has a positive affinity for associated primary content. For example, the favorite control 704 can be selected to add the introductory item 702 and/or associated primary content to a list of favorite items associated with a user.

Additionally or alternatively, selection of the favorite control 704 can publish an indication of the introductory item 702 and/or associated primary content to a network resource, such as a web page. For instance, a user can select the favorite control 704 to cause a graphical representation of the introductory item 702 to be published to a social media platform, such as a website that publishes social media information for various users. A copy of the introductory item 702, for example, can be published to a social media platform. This can enable other users that view the introductory item 702 via the social media platform to select and/or interact with the introductory item 702 to view associated primary content, further information about associated primary content, and/or other types of summary content.

The introductory item 702 also includes a play all control 706, which is selectable to initiate playback of associated primary content from a portion of primary content that corresponds to the introductory item 702. A summary item, for instance, can be correlated to a particular portion of primary content. In at least some implementations, the correlation can be made by linking a summary item to a portion of timecode for a corresponding portion of primary content. Thus, an instance of primary content (e.g., a television episode) can be segmented into sub-portions of content with corresponding sub-portions of timecode. The sub-portions of timecode can be linked to instances of summary content to enable summary content to be linked to corresponding sub-portions of primary content.

A segment play control 708 is also included, which is selectable to cause an associated portion of primary content to be played, e.g., without playing other portions of primary content. Thus, selection of the segment play control 708 can enable a content clip to be played from associated primary content, without initiating playback of the primary content from beginning to end.

The introductory item 702 further includes an add control 710, which is selectable to add the introductory item 702 to various lists and/or to flag the introductory item for various purposes. For instance, the add control 710 can be selected to bookmark the introductory item 702 such that the introductory item 702 can be added to a list of bookmarks. As another example, selecting the add control 710 can add the introductory item 702 and/or associated primary content to a playlist. As detailed elsewhere herein, a user can access a playlist of summary content to initiate viewing of information about the summary content and/or to initiate playback of associated primary content. Thus, the add control 710 and/or the favorite control 704 provide ways in which summary content and/or associated primary content can be marked for later viewing, such that a currently ongoing viewing experience is not disturbed.

The summary content 700 further includes a summary item 712, which is a representation of a corresponding portion of primary content. The summary item 712 includes various selectable controls which are selectable to perform various actions related to the summary item 712. Details concerning the selectable controls are discussed above.

A highlight item 714 is further included, which represents a particular highlighted portion of associated primary content. The highlight item 714, for example, can include a pertinent quote, an important event (e.g., an instance replay of an important event), a key instruction, and so forth, from primary content.

The summary content 700 includes an advertisement ("ad") item 716, which includes an advertisement for an entity associated with primary content. The ad item 716 is selectable to retrieve and present additional information associated with the entity, such as a webpage for the entity, a map, a service that enables goods and/or services from the entity to be purchased, a coupon, and so forth.

In at least some implementations, an entity can pay for the ability to have summary content (e.g., the ad item 716) inserted on their behalf. For instance, an enterprise and/or other entity may purchase advertising space within summary content, in which advertisements can be inserted. In at least some embodiments, an advertiser not associated with primary content (e.g., not a sponsor of primary content) may purchase advertising space in summary content for the primary content. Thus, summary content can include advertisements for various goods and/or services that may be pertinent and/or relevant to either or both of primary content and summary content.

Additional summary items 718, 720, and 722 are further included as part of the summary content 700. These summary items represent subsequent portions of primary content, and are selectable to retrieve and present supplementary information about associated primary content. The summary items 718, 720, and 722 further include various selectable controls that are selectable to perform various actions, examples of which are detailed above.

At least some embodiments enable users to provide their own supplementary content to summary content to personalize summary content and/or associated primary content. For example, an end-user of primary content can provide comments, graphics, audio, links to other content, and so on. Such user-provided content can be linked to summary content such that when associated primary content is subsequently presented, the user-provided content can be presented. The user-provided content may also be shared with other users, such as via a social networking platform, a content sharing platform, and so forth.

Together, the various summary items of the summary content 700 present a summary and/or overview of an instance of primary content. For example, an instance of primary content can be segmented into various portions, with at least some of the portions being represented by a corresponding portion of summary content.

According to various embodiments, implementations enable viewing and interaction with summary content in various ways. For instance, summary content can be presented as browsable and/or searchable content. As just one example, consider the following implementation.

Figure 8:
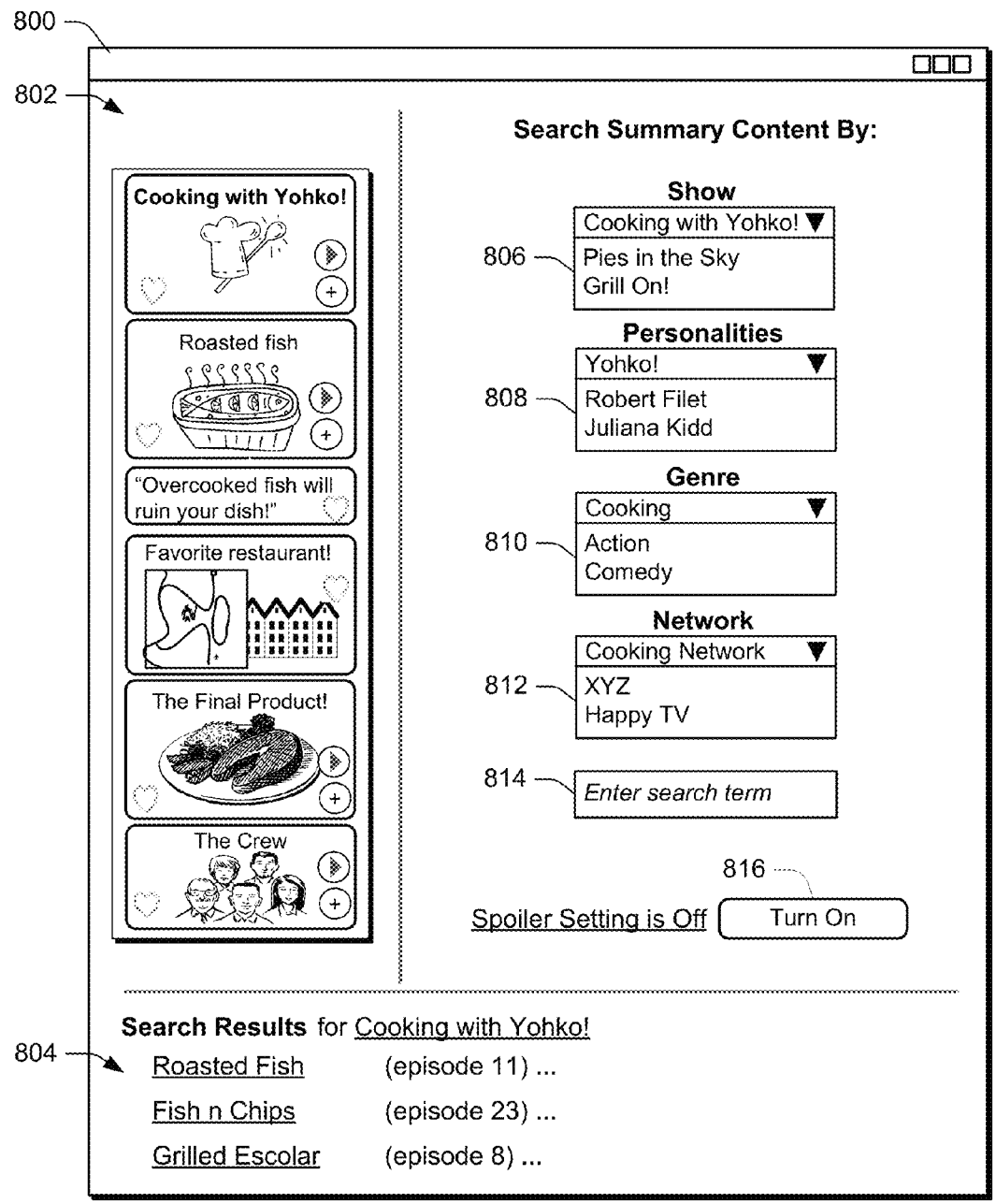
FIG. 8 illustrates an example summary content interface in accordance with one or more embodiments.

FIG. 8 illustrates an example summary content interface 800 in accordance with one or more embodiments. Generally, the summary content interface 800 represents a graphical user interface that enables various types of interactions with summary content, primary content, and/or other types of content. In at least some embodiments, the summary content interface 800 can be presented by an application (e.g., the summary content module 112), as a webpage, adjacent to primary content on a single device, and so on.

The summary content interface 800 includes a summary content region 802, in which summary content can be displayed. In at least some embodiments, summary content can be presented in the summary content region 802 in response to a search and/or request for summary content, such as detailed below. Alternatively or additionally, the summary content region 802 can include summary content that is bookmarked and/or favorited, as discussed above and below.

Also included is a search results region 804, which can display results of a search of summary content in various ways. For instance, selectable text descriptions of search results can be displayed in the search results region 804. Selection of the select text descriptions can cause different actions, such as a preview of the selected summary content to be presented in the summary content region 802, a presentation of a different graphical user interface that is populated with the selected summary content, and so forth.

The summary content interface 800 further includes several search menus that can be used to search for summary content according to various parameters. While some of the menus are illustrated as drop-down menus, alternative and/or additional embodiments may utilize Tillable menus in which a user can provide text input to search for summary content. In at least some embodiments, drop-down menus can include pre-specified search terms that are filtered such that only search terms are presented for which summary content is available. Search results from a search initiated via the different search menus can be presented in various ways, such as in the search results region 804, the summary content region 802, in a separate window, and so on.

The illustrated menus include a show menu 806, which enables summary content to be searched and/or presented according to an associated show, e.g., primary content. For instance, shows from various television networks can be presented in the show menu 806.

A personalities menu 808 is illustrated, which enables a search to be initiated based on different instances and/or types of personalities. Examples of personalities include actors, hosts, directors, writers, and so forth.

Further included is a genre menu 810, which enables a search to be initiated based on different genres of primary content. A network menu 812 is included, which enables a search to be initiated based on primary content and/or summary content from different networks. Examples of a network include a broadcast network, a cable network, a satellite network, a web-based content provider, and so on.

A general search menu 814 is illustrated, which enables a user to provide a search term (e.g., one word, multiple words, and so on) to initiate a search of summary content.

The summary content interface 800 further includes a spoiler setting control 816, which is selectable to toggle on and off a spoiler setting for summary content. Generally, a spoiler setting controls how much summary content is presented to a user at a given time.

For instance, consider sports summary content that summarizes a pre-recorded sporting event. The sports summary content may summarize the entire event, such as scoring events, highlights, a winner of the event, and so on. A user viewing the sporting event may be unfamiliar with a result of the sporting event, e.g., who won or lost. Thus, the user may want to view playback of the recorded sporting event without being presented with a result of the event before it occurs during playback. That is, the user may not want playback of the sporting event to be "spoiled" by already knowing its result.

Thus, turning the spoiler setting control 816 "on" enables summary content to be provided in such a way that key events that occur in associated primary content are not revealed until the events actually occur during playback of the primary content. For example, with the spoiler setting control 816 "on", summary content may simply include introductory content for pre-recorded primary content, such as a title, credits, date and/or duration information, and so on. Information about events that occur during playback of the primary content can initially be omitted.

When playback of the primary content starts, additional summary content can be provided, e.g., incrementally and corresponding to events that occur during playback of the primary content. Thus, the spoiler setting control 816 provides a user with the ability to control how much summary content is presented at a given time.

In at least some embodiments, the spoiler setting control 816 can be presented during playback of primary content such that presentation of summary content can be controlled during playback.

Figure 9:
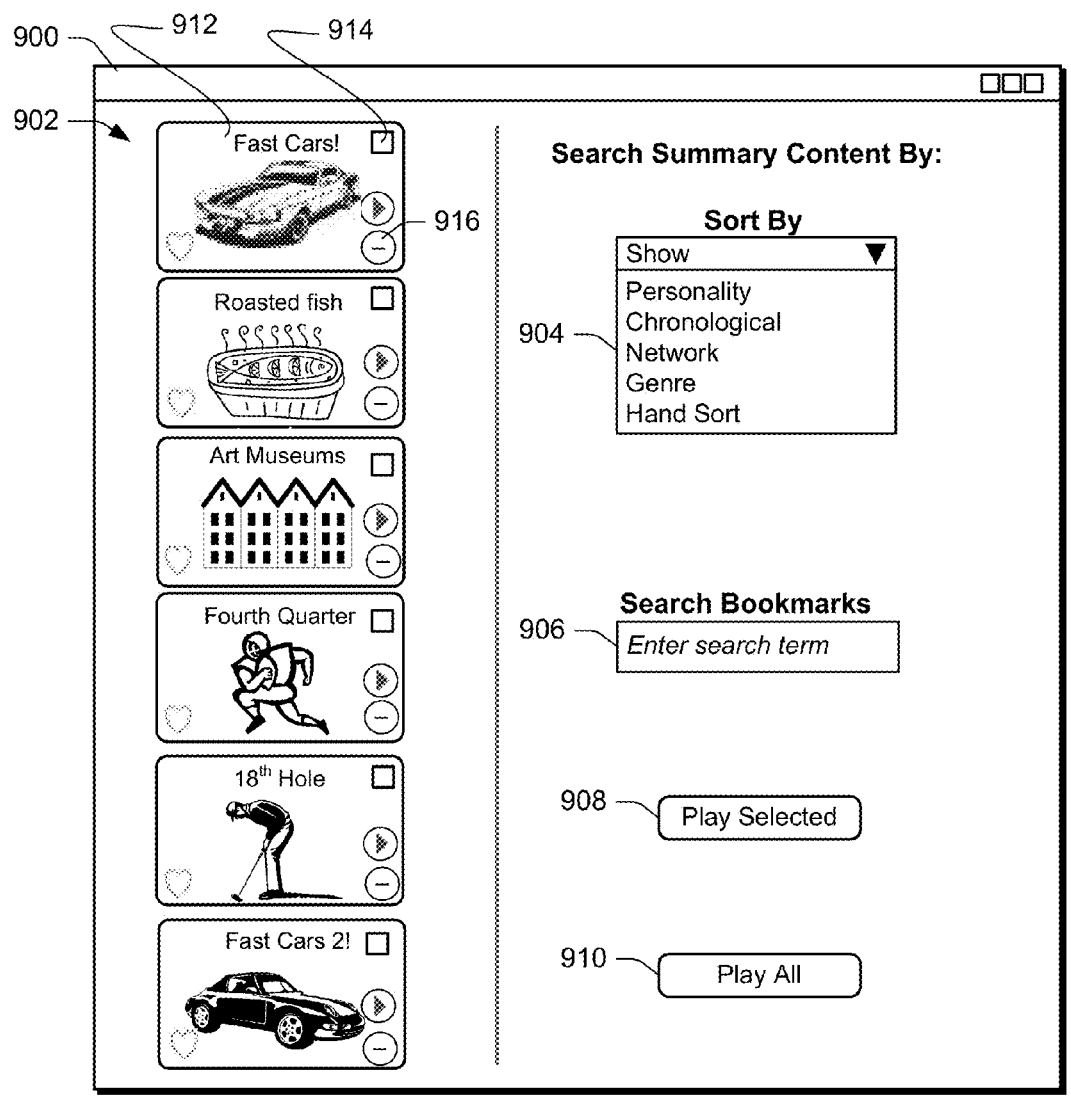
FIG. 9 illustrates an example favorites interface in accordance with one or more embodiments.

FIG. 9 illustrates an example favorites interface 900 in accordance with one or more embodiments. Generally, the favorites interface 900 represents a graphical user interface that enables summary content that has been bookmarked to be viewed, sorted, and so on. In at least some embodiments, the favorites interface 900 can be presented by an application (e.g., the summary content module 112), as a webpage, adjacent to primary content on a single device, and so on.

The favorites interface 900 includes a favorites region 902 that can be used to display summary content that has been bookmarked, liked, favorited, and so on. The favorites region 902, for instance, can display individual summary items selected from different instances of summary content. Thus, summary items included in the favorites region 902 can be associated with a variety of different primary content.

Further illustrated is a sort menu 904, which includes selectable options for sorting summary content in the favorites region 902. For instance, summary items can be automatically sorted based on personalities, chronologically (e.g., in an order in which the summary items were bookmarked, first aired, and so on), based on networks associated with the summary items, based on genre, and so on. A hand sort option is also included, which enables a user to sort summary items via other types of user input. For example, a user can drag individual summary items within the favorites region 902 to change a presentation order of the summary items.

A search field 906 is also included, which can be used to search bookmarked summary content. For example, a user can provide search terms to the search field 906 to search bookmarked summary content and/or summary items based on the search terms.

The favorites interface 900 further includes a play selected control 908 and a play all control 910. The play selected control 908 is selectable to initiate playback of primary content that corresponds to summary content and/or summary items that have been selected from the favorites region 902. For example, a summary item 912 includes a selection box 914 that can be selected to indication selection of the summary item 912. Selection of the play selected control 908 can initiate playback of primary content associated with the summary item 912, such as a segment of primary content. Thus, in at least some embodiments, multiple summary items can be selected to initiate playback of segments of primary content for respective summary items, e.g., as a continuous playback experience.

The play all control 910 is selectable to initiate playback of primary content associated with summary content and/or summary items listed in the favorites region 902. For instance, selection of the play all control 910 can cause playback of associated primary content for all of the summary items listed in the favorites region 902, e.g., in descending order from top to bottom.

The summary item 912 includes a remove control 916, which is selectable to remove the summary item 912 from a favorites list, and thus from the favorites interface 900.

Thus, embodiments enable bookmarked summary content to be viewed and managed in various ways. Further, custom playlists of primary content can be generated via selection and arrangement of associated summary content and/or summary items. Thus, collections of summary content can be generated based on various criteria, and instances of summary content can provide links to associated primary content such that primary content can be accessed via the summary content.

The summary content interface 800 and the favorites interface 900 are illustrated for purpose of example only, and techniques discussed herein can be employed utilizing a variety of different graphical interfaces with a variety of different arrangements and functionalities in accordance with the claimed embodiments. Having discussed some example implementations of summary content, consider now a discussion of some example procedures in accordance with one or more embodiments.

Example Procedures

Figure 10:
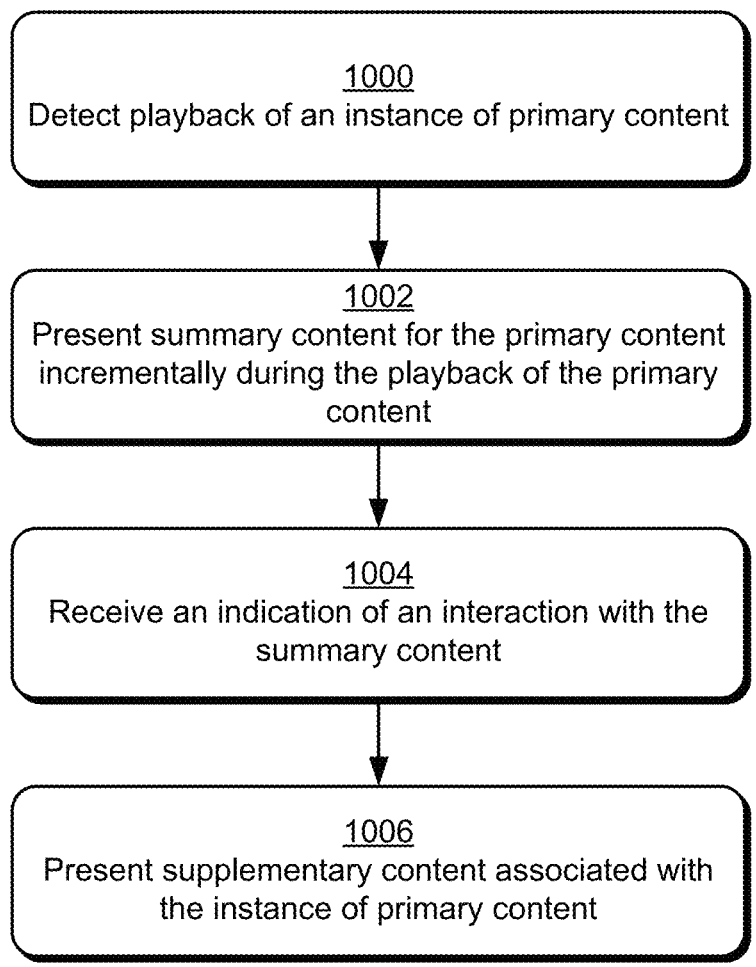
FIG. 10 is a flow diagram that describes steps in a method in accordance with one or more embodiments.

FIG. 10 is a flow diagram that describes steps in a method in accordance with one or more embodiments. In at least some implementations, the method describes an example technique for presenting and/or interacting with summary content. In at least some embodiments, the method can be implemented by the summary content module 112.

Step 1000 detects playback of an instance of primary content. The instance of primary content, for example, can correspond to a television show or other program that is displayed. Various techniques can be employed to detect that an instance of primary content is being played back. For example, presentation of summary content can be synchronized with a broadcast schedule such that presentation of summary content is initiated synchronously with playback of associated primary content.

In at least some embodiments, summary content may be broadcast along with associated primary content, such as in the same signal, in an auxiliary signal, and so forth. In yet another embodiment, functionality may be employed (e.g., by a primary content provider, summary content provider, and so on) to monitor for playback of primary content, and to provide notification that such playback has begun to initiate playback of summary content.

Step 1002 presents summary content for the primary content incrementally during the playback of the primary content. For example, various events that occur during playback of primary content can trigger presentation of associated summary content. An event, for example, can correspond to a particular point during display and/or playback of the primary content. Examples of an event include a beginning portion of primary content, a transition between segments of primary content, a highlight that occurs during primary content, and so forth. As referenced above, an event can have an associated timecode that can be used to trigger presentation of associated summary content. Thus, as portions of primary content are played back, summary content for the portions can be presented to provide an incrementally progressing encapsulation of the primary content.

In at least some embodiments, the summary content can be presented on a device separate from a device on which the primary content is presented. Alternatively or additionally, the summary content can be presented on the same device as the primary content.

Step 1004 receives an indication of an interaction with the summary content. A user, for example, can select the summary content via any suitable type of user input.

Step 1006 presents supplementary content associated with the instance of primary content. The supplementary content, for example, can be presented in response to the indication of the interaction with the summary content. The supplementary content can be presented in a variety of different ways. For example, supplementary content can be presented as part of a graphical user interface in which primary content and/or summary content is presented. Alternatively or additionally, supplementary content can be provided in a separate graphical user interface, such as part of a webpage that is presented in response to selection of summary content. Thus, in at least some embodiments, selection of summary content causes a graphical user interface to be presented and populated with supplementary content.

Generally, supplementary content is content that provides information about and/or enhances primary content. For example, supplementary content can include statistics about an athlete that is participating in a sporting event included with primary content. As another example, supplementary content can include a biography of an actor that is part of a cast for primary content. Supplementary content can be implemented in a variety of different ways, such as text content, images, video content, audio content, slide shows of primary content and/or supplementary content, detailed graphics (e.g., 360 degree views of images) and so on. Thus, summary content can serve as a bridge between primary content and supplementary content. This can enable a user to view summary content on its own without automatically being presented with supplementary content. If the user wishes to be presented with supplementary content, the user can do so by selecting summary content.

Figure 11:
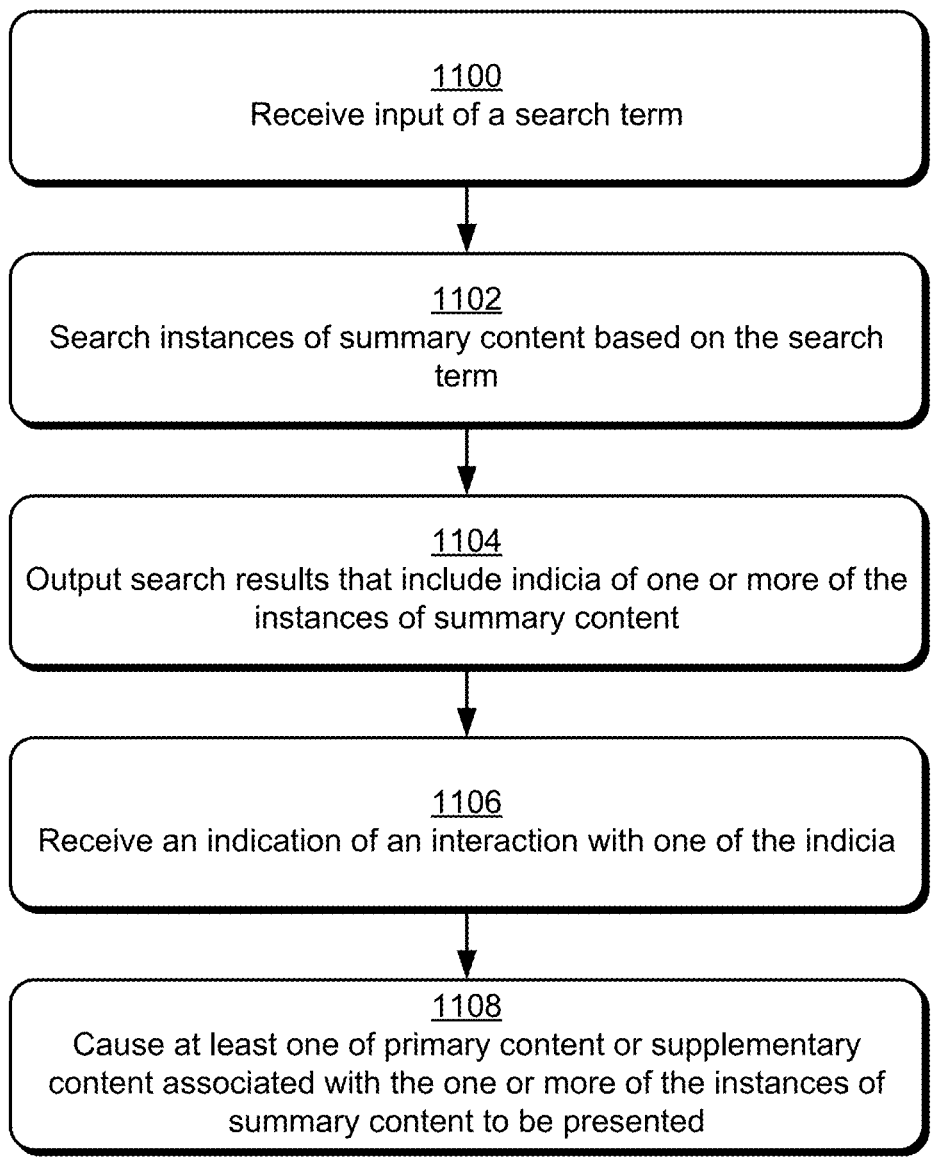
FIG. 11 is a flow diagram that describes steps in a method in accordance with one or more embodiments.

FIG. 11 is a flow diagram that describes steps in a method in accordance with one or more embodiments. In at least some implementations, the method describes an example technique for searching summary content.

Step 1100 receives input of a search term. The search term, for example, can be input in various ways. For example, the search term can be selected via a drop-down menu that includes pre-specified search terms, entered into a Tillable field via user input, and so forth.

Step 1102 searches instances of summary content based on the search term. Step 1104 outputs search results that include indicia of one or more of the instances of summary content. For example, text descriptions of summary content that correspond to the search term can be output. As another example, thumbnail images can be output that include graphics from summary content for the search results. In yet another example, actual instances of summary content can be output, partially and/or in their entirety.

According to one or more embodiments, results of a search of summary content can be output as individual summary items, e.g., sub-portions of summary content. Thus, a search result can include a collection of content items associated with different instances of primary content that are presented based on correlation with the search term.

Step 1106 receives an indication of an interaction with the indicia. A user, for example, can select the summary content via any suitable type of user input.

Step 1108 causing at least one of primary content or supplementary content associated with the one or more of the instances of summary content to be presented. For example, selection of the summary content can cause a portion of primary content to be presented, such as a segment of primary content associated with the instance of summary content. Alternatively or additionally, an entire instance of primary content can be presented, e.g., from beginning to end. Example implementations for presentation of supplementary content are discussed above.

Thus, in at least some embodiments, summary content can be utilized to summarize instances of primary content, and to enable primary content and/or supplementary content to be retrieved and presented in response to interaction with the summary content.

Figure 12:
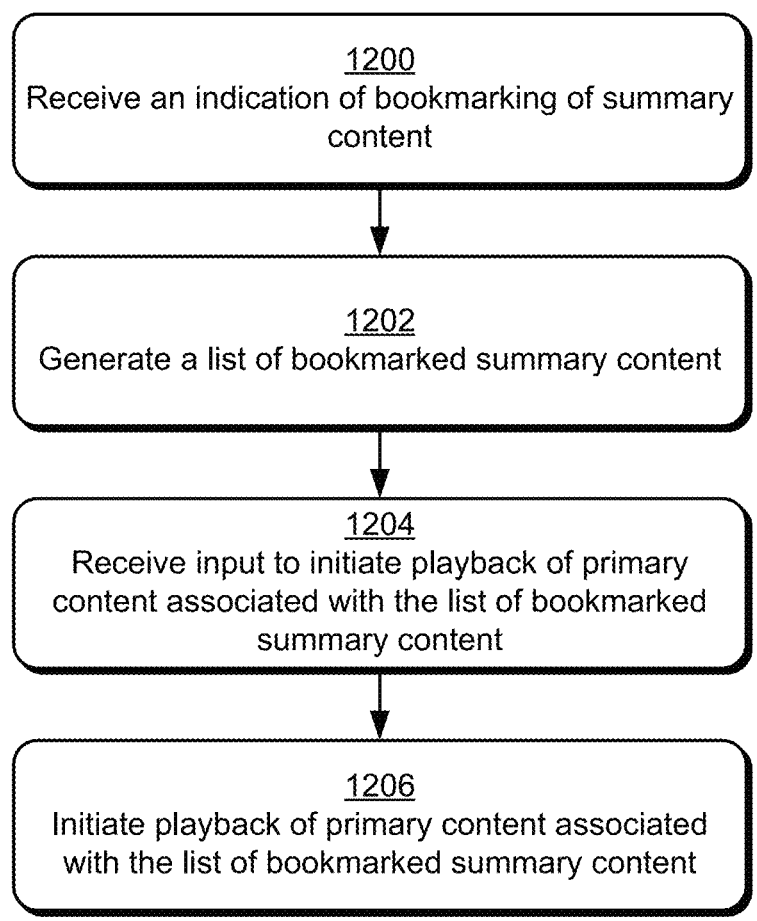
FIG. 12 is a flow diagram that describes steps in a method in accordance with one or more embodiments.

FIG. 12 is a flow diagram that describes steps in a method in accordance with one or more embodiments. In at least some implementations, the method describes an example technique for compiling a playlist based on selected summary content.

Step 1200 receives an indication of bookmarking of summary content. For example, a user can bookmark an instance of summary content and/or a summary item included as part of summary content. Bookmarking, for instance, can include user selection of a control or other bookmarking functionality. As referenced above, a summary item corresponds to a portion of summary content, such as an item among multiple different items that combine to form an instance of summary content. Thus, in at least some embodiments, summary items from different instances of summary content can be bookmarked.

Step 1202 generates a list of bookmarked summary content. For instance, bookmarked summary content and/or summary items can be compiled into a list and displayed, such as a favorites list, a playback list, and so forth. In at least some embodiments, the list can include summary content and/or summary items associated with different instances of primary content. The list can be sorted chronologically, such as according to a temporal order in which the summary content and/or summary items were bookmarked. The list can be sorted in a variety of other orders, however, in accordance with embodiments discussed herein.

Step 1204 receives input to initiate playback of primary content associated with the list of bookmarked summary content. Input can be received, for example, based on user selection of a playback control, examples of which are discussed above. For instance, a user can select a play all control or a segment play control displayed as part of an instance of summary content. As discussed above, a user can specify that primary content associated with a subset of bookmarked summary content is to be played back, or that primary content for an entire list of bookmarked summary content is to be played back.

Step 1206 initiates playback of primary content associated with the list of bookmarked summary content. Playback, for example, can be initiated based on user selection of a playback control, examples of which are discussed above. For instance, if a user selects a segment play control, a segment of primary content associated with an instance of bookmarked summary content can be played back, e.g., less than an entire instance of the primary content. In response to a selection of a play all control, however, an entire instance of associated primary content can be played back. In at least some embodiments, primary content associated with summary content and/or summary items can be played back in a designated order, such as a sort order specified by a user.

Having discussed some example procedures, consider now a discussion of an example system and device in accordance with one or more embodiments.

Example System and Device

Figure 13:
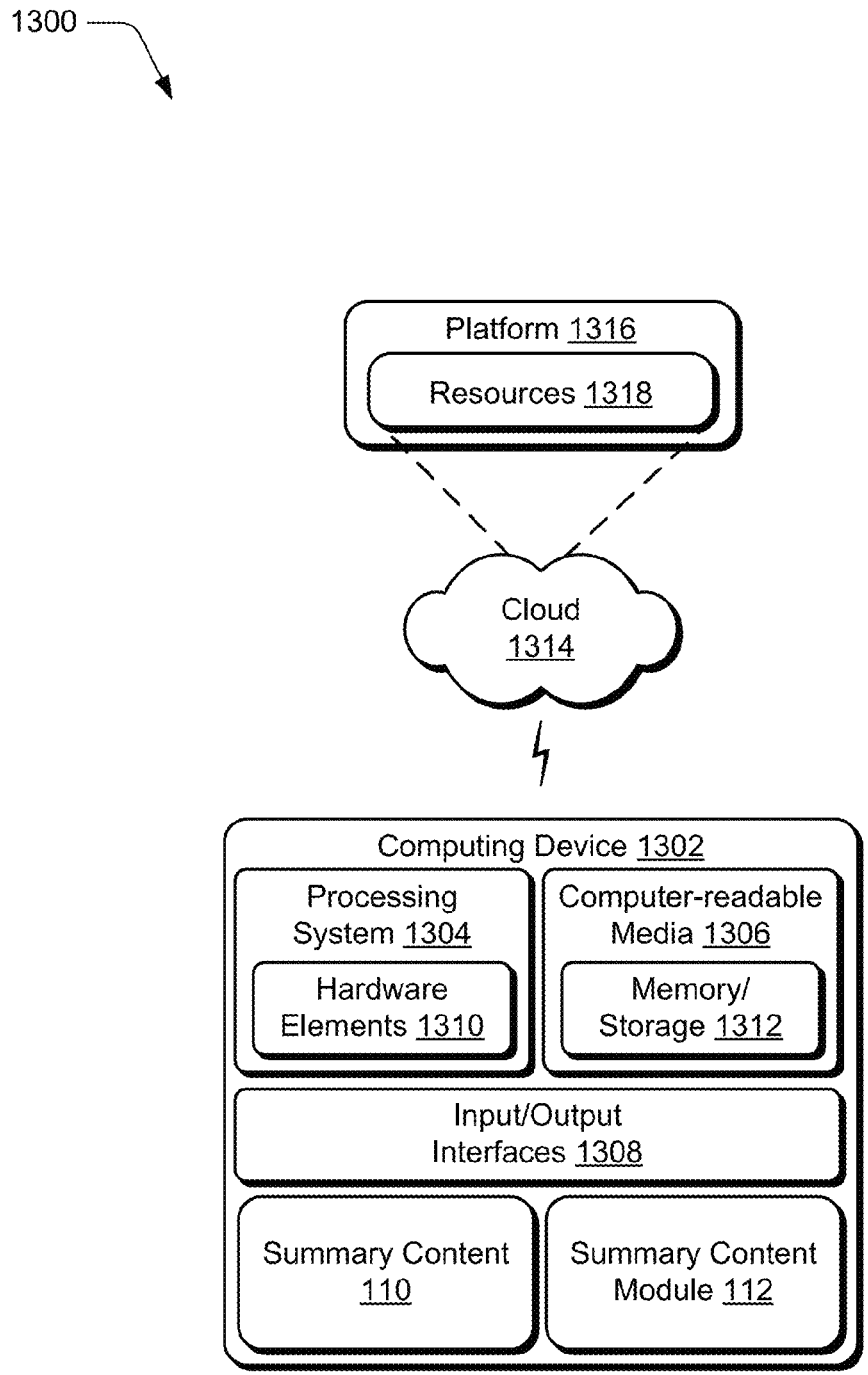
FIG. 13 illustrates an example system and computing device as described with reference to FIG. 1, which are configured to implement embodiments of techniques described herein.

FIG. 13 illustrates an example system generally at 1300 that includes an example computing device 1302 that is representative of one or more computing systems and/or devices that may implement the various techniques described herein. This is illustrated through inclusion of the summary content 110 and the summary content module 112, which may be employed to implement techniques for presentation of summary content for primary content discussed herein. The computing device 1302 may be, for example, a server of a service provider, a device associated with a client (e.g., a client device), an on-chip system, and/or any other suitable computing device or computing system. In at least some implementations, the computing device 1302 represents an example embodiment of the consumer device 102 and/or the companion device 104 of environment 100.

The computing device 1302 as illustrated includes a processing system 1304, one or more computer-readable media 1306, and one or more I/O interfaces 1308 that are communicatively coupled and/or connected, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware elements 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1306 are illustrated as including memory/storage 1312. The memory/storage 1312 represents memory/storage capacity associated with one or more computer-readable media. The memory/storage 1312 may include volatile media (such as random access memory (RAM)) and/or nonvolatile media (such as read only memory (ROM), Flash memory, optical disks, magnetic disks, and so forth). The memory/storage 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100, the system 1300, and so on.

CONCLUSION

Techniques for presentation of summary content for primary content are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. One or more computer-readable storage media comprising instructions stored thereon that, responsive to execution by a computing device, cause the computing device to perform operations comprising:
    searching on a first device instances of summary content based on a search term;
    outputting on the first device search results that include an indicia of an instance of summary content in response to said searching, the indicia including a play all control that is selectable to initiate playback of an entire instance of associated primary content from a portion of the primary content represented by the summary content, and a segment play control that is selectable to initiate playback of a segment of the primary content associated with the indicia without initiating playback of other portions of the primary content;
    receiving an indication of an interaction with the at least one of the indicia; and
    causing a presentation of one or more advertisements and at least one of primary content or supplementary content associated with the instance of summary content on a second device and in response to said receiving.

2. One or more computer-readable storage media as recited in claim 1, wherein said outputting comprises outputting the indicia of the instance of summary content as one or more images that correspond to one or more portions the primary content.

3. One or more computer-readable storage media as recited in claim 1, wherein said outputting further comprises outputting indicia of multiple instances of summary content as summary content associated with different instances of primary content.

4. One or more computer-readable storage media as recited in claim 1, wherein said outputting further comprises outputting the indicia of the instance of summary content as summary items that correspond to individual segments of primary content.

5. One or more computer-readable storage media as recited in claim 1, wherein said outputting further comprises outputting indicia of multiple instances of summary content, said receiving comprises receiving a user selection of multiple of the indicia, and wherein said causing comprises causing multiple different segments of the primary content that correspond to the multiple of the indicia to be output as a continuous playback.

6. A computer-implemented method comprising:
    searching on a first device instances of summary content based on a search term;
    outputting search results that include an indicia of an instance of summary content in response to said searching, the indicia including a play all control that is selectable to initiate playback of an entire instance of associated primary content from a portion of the primary content represented by the summary content, and a segment play control that is selectable to initiate playback of a segment of the primary content associated with the indicia without initiating playback of other portions of the primary content;
    receiving an indication of an interaction with the indicia; and
    causing a presentation of one or more advertisements and at least one of primary content or supplementary content associated with the instance of summary content on a second device and in response to said receiving.

7. A computer-implemented method as recited in claim 6, wherein said outputting comprises outputting the indicia of the instance of summary content as one or more images that correspond to one or more portions the primary content.

8. A computer-implemented method as recited in claim 6, wherein said outputting further comprises outputting multiple indicia of multiple instances of summary content as summary content associated with different instances of primary content.

9. A computer-implemented method as recited in claim 6, wherein said outputting further comprises outputting indicia of multiple instances of summary content as summary items that correspond to individual segments of primary content.

10. A computer-implemented method as recited in claim 6, wherein said outputting further comprises outputting indicia of multiple instances of summary content, said receiving comprises receiving a user selection of multiple of the indicia, and wherein said causing comprises causing multiple different segments of the primary content that correspond to the multiple of the indicia to be output as a continuous playback.

11. A computer-implemented method as recited in claim 6, further comprising:
    receiving an indication of a bookmarking of the instance of summary content; and
    causing a list of bookmarked summary content including the instance of summary content to be presented.

12. A computer-implemented method as recited in claim 6, further comprising causing a presentation of supplementary content on the second device, the supplementary content comprising content that is different than the primary content and that pertains to the primary content.

13. A system comprising:
    one or more processors;
    one or more computer-readable storage media storing computer-executable instructions that, responsive to execution by the one or more processors, cause the system to perform operations comprising:
        searching on a first device instances of summary content based on a search term;
        outputting on the first device search results that include an indicia of an instance of summary content in response to said searching, the indicia including a play all control that is selectable to initiate playback of an entire instance of associated primary content from a portion of the primary content represented by the summary content, and a segment play control that is selectable to initiate playback of a segment of the primary content associated with the indicia without initiating playback of other portions of the primary content;
        receiving an indication of an interaction with the at least one of the indicia; and
        causing a presentation of at least one of primary content or supplementary content associated with the instance of summary content on a second device and in response to said receiving.

14. A system as recited in claim 13, wherein the operations further comprise causing an advertisement to be output on the second device in response to said receiving the indication of an interaction with the at least one of the indicia.

15. A system as recited in claim 13, wherein said outputting comprises outputting the indicia of the instance of summary content as one or more images that correspond to one or more portions the primary content.

16. A system as recited in claim 13, wherein said outputting further comprises outputting multiple indicia of multiple instances of summary content as summary content associated with different instances of primary content.

17. A system as recited in claim 13, wherein said outputting further comprises outputting indicia of multiple instances of summary content as summary items that correspond to individual segments of primary content.

18. A system as recited in claim 13, wherein said outputting further comprises outputting indicia of multiple instances of summary content, said receiving comprises receiving a user selection of multiple of the indicia, and wherein said causing comprises causing multiple different segments of the primary content that correspond to the multiple of the indicia to be output as a continuous playback.

19. A system as recited in claim 13, wherein the operations further comprise:
   receiving an indication of a bookmarking of the instance of summary content; and
   causing a list of bookmarked summary content including the instance of summary content to be presented.

20. A system as recited in claim 13, wherein the operations further comprise causing a presentation of supplementary content on the second device, the supplementary content comprising content that is different than the primary content and that pertains to the primary content.

\* \* \* \* \*